US011850459B2

(12) United States Patent
Spiegl et al.

(10) Patent No.: US 11,850,459 B2
(45) Date of Patent: Dec. 26, 2023

(54) TRIGGERING DEVICE OF AN EXTINGUISHING SYSTEM

(71) Applicant: Hoerbiger Wien GmbH, Vienna (AT)

(72) Inventors: Bernhard Spiegl, Vienna (AT); Christian Kernbichler, Fischamend (AT); Matthias Kornfeld, Brunn/Geb. (AT); Thomas Schragl, Vienna (AT)

(73) Assignee: HOERBIGER WIEN GMBH, Vienna (AT)

( * ) Notice: Subject to any disclaimer, the term of this patent is extended or adjusted under 35 U.S.C. 154(b) by 624 days.

(21) Appl. No.: 16/763,918

(22) PCT Filed: Nov. 7, 2018

(86) PCT No.: PCT/EP2018/080411
§ 371 (c)(1),
(2) Date: May 13, 2020

(87) PCT Pub. No.: WO2019/096639
PCT Pub. Date: May 23, 2019

(65) Prior Publication Data
US 2020/0368569 A1 Nov. 26, 2020

(30) Foreign Application Priority Data

Nov. 14, 2017 (AT) .............................. A 50956/2017

(51) Int. Cl.
A62C 37/42 (2006.01)
A62C 3/04 (2006.01)
(Continued)

(52) U.S. Cl.
CPC ............... A62C 37/42 (2013.01); A62C 3/04 (2013.01); A62C 35/13 (2013.01); A62C 37/46 (2013.01);
(Continued)

(58) Field of Classification Search
CPC ......... A62C 37/04; A62C 37/40; A62C 37/42; A62C 37/46; A62C 35/13
(Continued)

(56) References Cited

U.S. PATENT DOCUMENTS

| 4,589,496 A | * | 5/1986 | Rozniecki | A62C 35/02 251/74 |
| 2007/0132250 A1 | * | 6/2007 | Schnekenburger | G08B 17/06 292/144 |
| 2015/0144361 A1 | * | 5/2015 | Kluz | A62C 37/46 169/61 |

FOREIGN PATENT DOCUMENTS

| DE | 284194 | 2/1914 |
| DE | 2434049 A1 | 2/1976 |

(Continued)

Primary Examiner — Cody J Lieuwen
(74) Attorney, Agent, or Firm — Dykema Gossett PLLC

(57) ABSTRACT

Various aspects of the invention are directed to a triggering device for a quickly triggering extinguishing system for explosion suppression. In some embodiments of the present disclosure, the triggering device may include a pawl body having a pawl flank, a catch, at least one electromagnet to transmit an electromagnetic field, and a sliding pin. The sliding pin triggers an extinguishing system for explosion suppression by movement from a blocking position into a release position. In the blocking position, the sliding pin is pushed against the pawl flank of the pawl body by means of the catch and is held in the blocking position by said pawl flank. The pawl body releases the engagement of the catch and the pawl flank, and thereby releases the sliding pin, in response to the at least one electromagnet exerting the electromagnetic field on the pawl body.

17 Claims, 2 Drawing Sheets

(51) Int. Cl.
*A62C 37/46* (2006.01)
*F16K 17/04* (2006.01)
*F16K 17/36* (2006.01)
*F16K 31/06* (2006.01)
*A62C 35/13* (2006.01)

(52) U.S. Cl.
CPC ........ *F16K 17/0486* (2013.01); *F16K 17/363* (2013.01); *F16K 31/0655* (2013.01)

(58) Field of Classification Search
USPC .................................................... 169/29, 61
See application file for complete search history.

(56) References Cited

FOREIGN PATENT DOCUMENTS

| | | | | |
|---|---|---|---|---|
| EP | 0882472 | A1 * | 6/1997 | ............... A62C 3/04 |
| EP | 0824027 | A1 | 2/1998 | |
| EP | 0882472 | A1 | 12/1998 | |
| EP | 1025878 | B1 | 7/2002 | |
| KR | 20-0139219 | Y1 | 4/1999 | |
| WO | 2017019904 | A1 | 2/2017 | |

* cited by examiner

TRIGGERING DEVICE OF AN EXTINGUISHING SYSTEM

CROSS-REFERENCE TO RELATED APPLICATIONS

This application is a national stage filing based upon International PCT Application No. PCT/EP2018/080411, filed 7 Nov. 2018, which claims the benefit of priority to Austria application No. A 50956/2017, filed 14 Nov. 2017.

BACKGROUND

The invention relates to a triggering device for a quickly triggering extinguishing system for explosion suppression, the triggering device having a sliding pin, wherein the triggering of the extinguishing system is brought about by movement of the sliding pin from a blocking position into a release position, and wherein in the blocking position the sliding pin is held against a pawl flank of a pawl body by means of a catch and is held in the blocking position by said pawl flank.

Furthermore, the invention relates to an extinguishing system for explosion suppression having an extinguishing agent container which can be closed in a pressure-tight manner via a closure member, the closure member being lockable in the closed position by means of at least one locking element.

In a further aspect, the invention relates to a method for carrying out a test triggering using an extinguishing system.

Quickly triggering extinguishing systems are used for explosion suppression, wherein powder extinguishers in particular using sodium powder and nitrogen are used with a system pressure of approx. 60 bar. As soon as pressure sensors detect an incipient explosion, a closure system of the extinguisher is opened, the closure system generally being blown up with explosives due to the required short reaction times. Triggering requires a very high dynamic, with triggering times of less than 10 ms.

The explosives pose a problem in many respects, with the costs, handling, storage, transport, shipping of spare parts, warehousing, importing to different countries, durability and verifiability in particular each creating their own problem areas.

Attempting to replace these explosives with mechanical means presents numerous technical hurdles. In particular, trigger systems from related technical areas, such as conventional fire extinguishing systems, cannot achieve the short triggering times required for explosion suppression.

EP 1025878 A1 discloses a mechanical trigger mechanism for a powder extinguisher for explosion suppression, in which the release of a pawl takes place via a rotary actuator having intermediate rolling elements. Thus, the system friction is reduced, which is substantial for reliable and quick opening. The rotary actuator is driven by a torque motor.

There is also a need for triggering devices for quickly triggering extinguishing systems for explosion suppression, which are simple in construction and inexpensive to manufacture, and which have increased operational reliability and reduced maintenance costs. It is an object of the present invention to provide such systems.

SUMMARY OF THE INVENTION

According to the invention, these and other objects are achieved by a triggering device of the type mentioned at the outset, wherein the pawl body can be moved to release the engagement of the catch and the pawl flank and to release the sliding pin by means of at least one electromagnet which acts directly on the pawl body. This reduces the number of required moving parts of the triggering device.

The size, geometry and winding of the electromagnet can be optimized for high dynamics and low energy consumption. It must be taken into account that the energy required for triggering must be stored on the extinguishing system and that, for safety reasons, certain amounts of energy in the capacitors must not be exceeded. The system friction can be minimized by the electromagnet acting directly on the pawl body.

In an advantageous embodiment, the pawl body can be designed as an integral body, as a result of which the number of moving parts can be minimized.

Advantageously, the pawl body can be prestressed by means of a return spring in the direction of engagement of the catch and pawl flank. The return spring is used not only to reset after a test triggering but also to protect against vibrations and impacts and is dimensioned so that there is sufficient security against self-triggering even at the highest accelerations.

In a preferred embodiment according to the invention, an air gap between the pawl body and the electromagnet can have a wedge-like tapering cross section. This allows the electromagnet to exert a greater force on the pawl body, while at the same time allowing the movement required for the release of the catch by the pawl.

In a further advantageous embodiment of the invention, the pawl body can be pivotally mounted about a pivot point. An optimized arrangement of the pivot point and the distances to the pawl flank allow highly dynamic and reliable triggering. By adjusting the arrangement and shape of the pawl body and the angle of the pawl flank, the trigger behavior can be further optimized and made independent of the force acting on the sliding pin.

In an advantageous embodiment, the pivot point can be arranged in a region between the catch and a connecting head of the sliding pin next to the sliding pin, wherein the pivot point is preferably arranged, in particular vertically, at a maximum distance of 15 mm from the pin axis. This minimizes the forces required for triggering and the size. The pivot point can be designed as a swivel bearing.

In a further advantageous embodiment, the pivot point can be arranged in an imaginary extension of the sliding pin in a release direction behind the catch, the pivot point preferably being at a maximum distance of 15 mm from the pin axis, in particular vertically spaced.

The pivot point can be formed, for example, by an outer edge of the pawl body mounted in an inner edge of a housing. On the one hand, this reduces the system friction, on the other hand, the complexity and susceptibility to errors of the mechanics is minimized.

The pivot point can advantageously be positioned at a distance of between 10 mm and 50 mm from the electromagnet.

In a further advantageous embodiment, a pawl sensor can be provided for monitoring the position of the pawl body. This allows the locking status of the triggering device to be monitored remotely.

The invention further comprises an extinguishing system of the type mentioned at the outset, having the triggering device according to the invention, the triggering device acting on the locking element of the extinguishing system.

In an advantageous manner, the locking element can be blocked in the locking position of the closure member by means of an electromechanical actuator. Blocking the locking element is particularly necessary for maintenance purposes if triggering the extinguishing system must be avoided for safety reasons. With the electromechanical actuator, locking can take place directly via a central control system. The locking signal can be sent to the corresponding extinguishers via a bus cable and the locking is carried out by an electromechanical actuator.

In an advantageous embodiment, an actuator sensor can be provided for monitoring the position of the actuator. This allows the reaching of the locking position to be monitored remotely. A corresponding signal is only sent to the control system after the locking position has been reached. This type of remote locking, which can be monitored, is a great asset, particularly in exposed system parts such as high silos.

According to the invention, at least the actuator sensor, the pawl sensor, the actuator, and the electromagnet can advantageously be connected to a control system. This makes it possible to carry out a fully or partially automatic test triggering which is centrally controlled, thereby minimizing the maintenance and inspection effort of the system.

According to the invention, the test triggering can be carried out using the extinguishing system according to a method having the following steps: Blocking the locking element in the locking position of the closure member by means of the actuator, checking the blocking by means of the actuator sensor, releasing the sliding pin by releasing the pawl body by means of the electromagnet, checking that the test triggering was carried out by means of the pawl sensor, resetting the pawl body, checking the position of the pawl body, unlocking the locking element by means of the actuator. These steps can be carried out fully automatically via the control system without manual intervention in the extinguishing system.

BRIEF DESCRIPTION OF THE DRAWINGS

The present invention is described in greater detail in the following with reference to FIGS. 1 to 3, which show exemplary, schematic and non-limiting advantageous embodiments of the invention. In the drawings.

DETAILED DESCRIPTION

Figure 1:
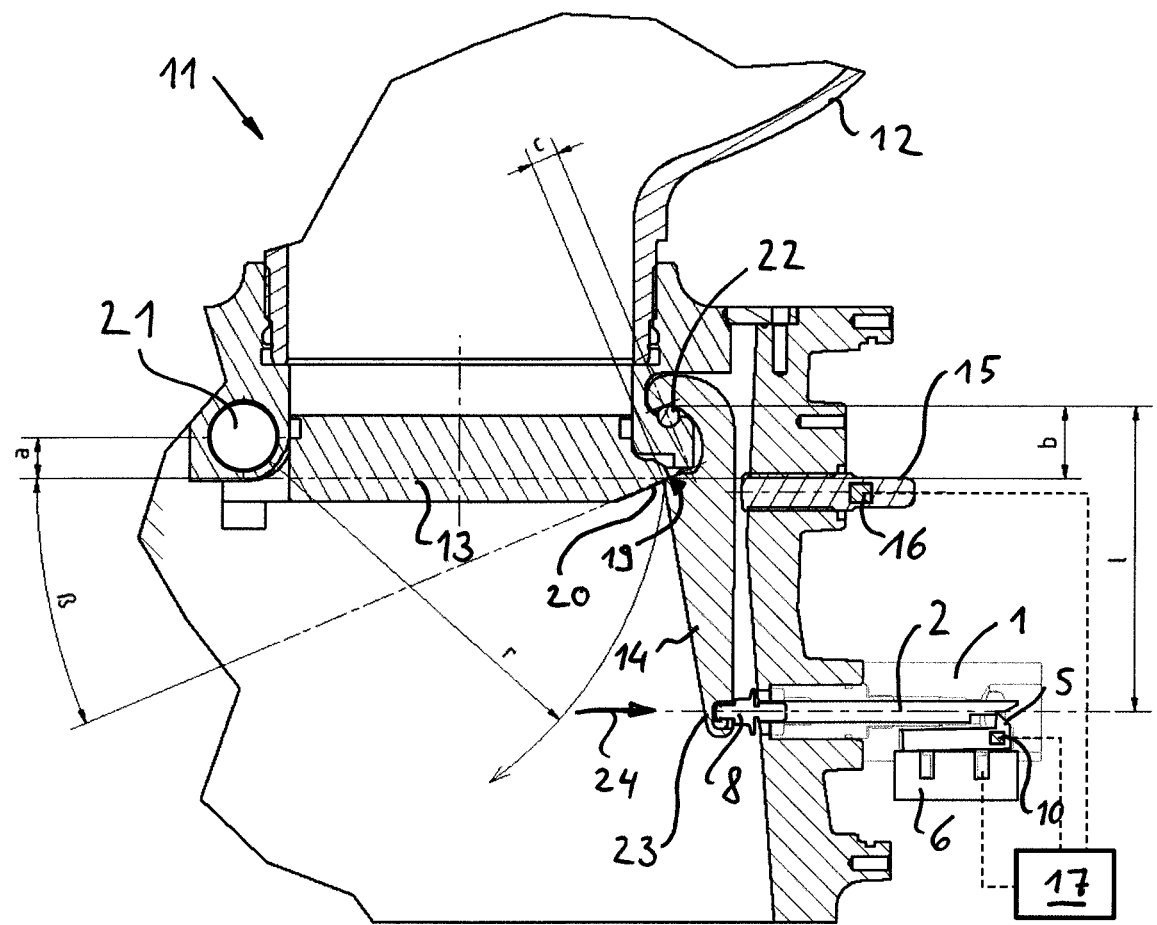
FIG. 1 is a sectional view of an extinguishing system according to the invention.

FIG. 1 shows the extinguishing system 11 according to the invention in a cross section. In a manner known per se, an extinguishing agent container 12 is closed with a closure member 13 designed as a flap. The extinguishing agent container 12 is pressurized and filled with an extinguishing agent. For example, a powder containing sodium powder can be used as the extinguishing agent, the extinguishing agent container being brought to a system pressure of approximately 60 bar with nitrogen. The closure member 13 is locked with a lever-like locking element 14. The locking element 14 presses with a locking surface 19 against a pressure surface 20 of the closure member 13.

The dimensions and relative arrangement of the contact plane between the locking surface 19 and the pressure surface 20, the center of rotation of a swivel bearing 21 of the locking member 13, and the center of rotation of a lever bearing 22 of the locking element 14, as well as the dimensions of the locking member 13 and the locking element 14 can be optimized to ensure, on the one hand, a secure locking of the extinguishing agent container 12 in a pressure-tight manner by means of the closure member 13, and on the other hand to ensure a sufficiently quick unlocking of the locking element 13 and opening of the closure member 13 when triggering the extinguishing system 11.

The locking is released by moving an actuation end 23 of the locking element 14 spaced from the lever bearing 22 in a release direction 24. For this purpose, the locking element 14 is connected at the actuation end 23 to a connecting head 8 of a sliding pin 2 to a triggering device 1, which is described in more detail below. If necessary, the actuation end of the locking element 14 can also act directly on the sliding pin 2 (without a connecting head 8). The shorter the required movement of the actuation end 23 in order to unlock the closure member 13, the faster a triggering of the extinguishing system 11 can be carried out. On the other hand, the movement cannot be minimized arbitrarily, since a secure closure of the extinguishing agent container 12 must be guaranteed.

So that no additional clamping elements are required, the dimensions and arrangements of the closure member 13 and the locking element 14 can preferably be selected such that the actuation end 23 is prestressed in the release direction 24 solely on account of the system pressure prevailing in the extinguishing agent container 12. The system pressure acts on the closure member 13, which exerts a force on the locking surface 19 of the locking element 14 via the pressure surface 20, which in turn brings about a prestress in the release direction 24.

The prestress causes the actuation end 23 to exert pressure on the sliding pin 2 of the triggering device 1 in the release direction 24. At a position spaced from the connecting head 8 in the release direction 24, the sliding pin 2 has a catch 3, which is held against the prestressing force by a pawl flank 4 of a pawl body 5. For triggering the extinguishing system, the catch 3 is released by a movement of the pawl body 5, so that the sliding pin 2 moves in the release direction 24 into a release position. The prestressing force acting on the connecting head 8 or directly on the sliding pin 2 must therefore be sufficiently large to overcome the system friction in the triggering device 1 and to move the sliding pin 2 into the release position in a highly dynamic manner (i.e. sufficiently quickly for the desired purpose of explosion suppression).

An exemplary embodiment of the triggering device 1 according to the invention will now be described in detail with reference to FIG. 2. The pawl body 5 has a substantially hook-like shape and is pivotally mounted at a pivot point 7, the pivot point 7 being arranged in the region between the connecting head 8 and the catch 3 above next to the sliding pin 2. The shape of the pawl body 5, the position of the pivot point 7 and the catch 3 (or the pawl flank 4) are coordinated with one another in such a way that only slight frictional forces act between the catch 3 and the pawl flank 4. This can be achieved in particular by arranging the pivot point 7 close to the pin axis, preferably at a maximum distance of 15 mm from the pin axis.

The pivot point 7 (or the pawl body 5) can preferably be arranged vertically above or below the sliding pin 2, but also laterally or at a different angle thereto. An arrangement vertically above or below, however, makes it easier to take into account the gravity acting on the pawl body 5.

The pawl body 5 is additionally held in the locked position by a return spring 9. The return spring 9 is not only used for the reset after a test triggering but also for security against vibrations and impacts, and is dimensioned such that there is sufficient security against self-triggering even at the highest accelerations that occur.

On the side of the pawl body 5 facing away from the sliding pin 2, an electromagnet 6 is arranged at a short distance from the pawl body 5. The pawl body has an anchor material (i.e. a material to which the electromagnetic field excited by the electromagnet 6 exerts an attractive force), so that it can be attracted by the activated electromagnet 6 against the restoring force of the return spring 9 and moved in the direction of the electromagnet 6. Advantageously, the pawl body 5 as a whole can consist of the anchor material. The distance between the pawl body 5 and the electromagnet 6 forms an air gap which is as thin as possible and which is just large enough to bring the pawl flank 4 out of engagement of the catch 3 when the electromagnet 6 is activated.

Due to the pivoting movement of the pawl body 5 around the pivot point 7, the distance between the pawl body 5 and the electromagnet 6 in the vicinity of the anchor point 7 can be made smaller than in the region of the pawl flank 4, where the maximum deflection of the pawl body 5 is required to release the catch 3. The air gap can thus have a wedge-like profile that tapers towards the anchor point 7. As a result, the air gap in the region of the windings of the electromagnet 6, which is closer to the anchor point 7, is very narrow, which maximizes the effect of the electromagnet 6 on the pawl body 7.

The position of the pawl body 5 can be electronically monitored by a pawl sensor 10.

By combining the electromagnet 6 designed as a highly dynamic magnet with the advantageous choice of the pivot point 7 and the dimensions, a highly dynamic and reliable triggering can be made possible. By adjusting the dimensions of the pawl body 5 and in particular the angle of the pawl flank 4, the triggering behavior can be further optimized and made largely independent of the prestressing force acting on the sliding pin 2.

Figure 3:
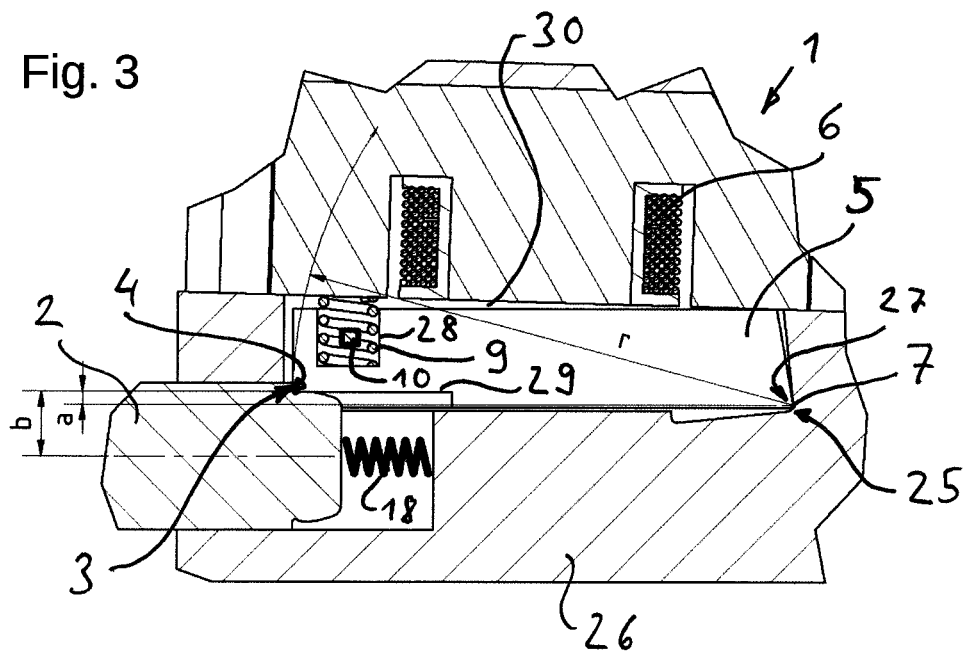
FIG. 3 is a sectional view of an inventive triggering device according to a second embodiment.

FIG. 3 shows a further advantageous embodiment of the triggering device 1 according to the invention. The pawl body 5 of the embodiment in FIG. 3 is substantially designed as a simple "plate," the pawl flank 4 being arranged on an edge of the pawl body 5. An edge of the pawl body 5 opposite the pawl flank 4 in the release direction forms the pivot point 7, this pivot point 7 being formed by the outer edge 27 of the pawl body 5 mounted in an inner edge 25 of a housing 26. Friction is minimized due to the substantially punctiform mounting and no additional components are required for the mounting. In particular, forces acting on the pawl body 5 from the sliding pin 2 are absorbed at the pivot point 7 without any significant frictional moments, as a result of which the triggering force is hardly influenced by the upcoming prestressing force.

Figure 2:
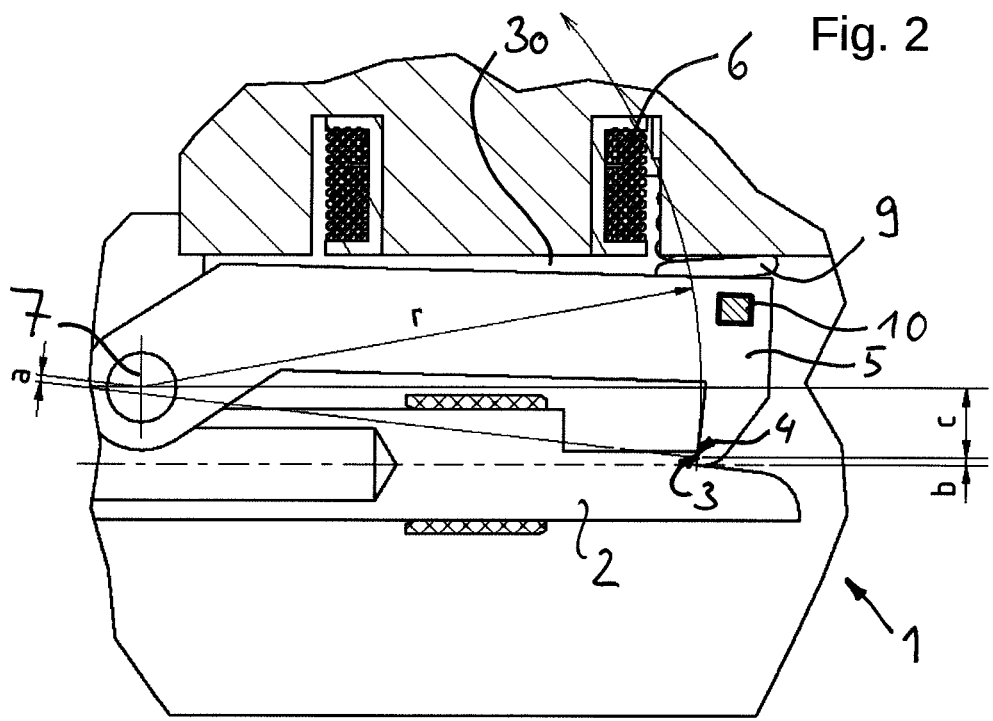
FIG. 2 is a sectional view of an inventive triggering device according to a first embodiment.

Another advantage of this embodiment is that the air gap between the pawl body 5 and the electromagnet 6 has been minimized again compared to the embodiment shown in FIG. 2. The air gap is very low on one side, so that high power and dynamics can be achieved with the electromagnet.

The pawl body 5 is pushed away from the electromagnet 6 by means of a return spring 9 and in the direction of an engagement of the pawl flank 4 and the catch 3. The return spring 9 can be inserted into a bore 28 provided in the pawl body 5, which allows simple assembly and minimizes the number of assembly elements required.

The catch 3 of the sliding pin 2 can be designed as a ring-shaped surface extending around the sliding pin 2, so that the sliding pin 2 can be designed as a rotating body that is easy to manufacture and that can be installed in any desired radial position, which simplifies assembly. In order to ensure an optimal attachment between the pawl flank 4 and the catch 3, a groove-shaped recess 29, for example, can be provided in the pawl body 5, into which the sliding pin 2 is appropriately received when it moves in the release direction 24 after the triggering.

The pawl body 5 can thus be designed as a simple, substantially block-shaped or cuboid body, in which only the bore 28 and the recess 29 are introduced. If necessary, individual edge surfaces, such as the short rear surface adjoining the outer edge 27, may be designed to be obliquely deviating from a cuboid shape.

In this embodiment too, the position of the pawl body 5 can be electronically monitored by a pawl sensor 10.

A pin return spring 18 can press the sliding pin 2 against the release direction 24, so that the locking element 14 is also held into a locking position of the closure member 13 if, for example, no pressure has yet built up in the extinguishing agent container 12 before filling.

Coming back to FIG. 1, a further security feature of the extinguishing system 11 according to the invention is described below.

An electromechanically actuatable actuator 15 is arranged adjacent to the locking element 14. For example, the actuator can substantially be designed as a movable pin (or a cam) which, in a position extended against the locking element 14, secures and locks the locking element 14 in the locking position of the closure member 13, and which in a retracted position allows the unlocking movement of locking element 14, thereby "unlocking" the latter. The actuator can be driven electromechanically, with or without a gear. The position of the actuator 15 can also be monitored remotely via an actuator sensor 16.

The blocking of the locking element 14 by the actuator 15 can be used during transport or if service work is to be carried out on the containers to be protected.

Both the actuating unit (not shown) of the actuator 15, as well as the actuator sensor 16, the pawl sensor 10, the electromagnet 6, and optionally further sensors and actuating units can be connected to a central control system 17. As a result, the blocking or securing can take place centrally directly via the control system 17, it being possible for a number of extinguishing systems 11 in one installation to be connected to the same control system 17. Control signals can be sent to the affected extinguishers and the sensor signals can be received, preferably via a bus connection.

The blocking of the locking element 14 by the actuator 15 can thus be triggered by the control system 17, wherein the reaching of the blocking position is monitored by the actuator sensor.

In the blocked position, it is possible to check the proper functioning of the triggering device by means of a test triggering. In addition to the smoothness, the dynamics can also be determined via sensors and compared with stored values. This verifiability of the triggering represents a further big difference to the systems equipped with explosives and can allow a significantly better SIL classification during a risk assessment.

Automatic test procedures at certain intervals with documentation can be implemented in systems.

REFERENCE NUMERALS

Triggering device 1
Sliding pin 2
Catch 3

Pawl flank 4
Pawl body 5
Electromagnet 6
Pivot point 7
Connecting head 8
Return spring 9
Pawl sensor 10
Extinguishing system 11
Extinguishing agent container 12
Closure member 13
Locking element 14
Actuator 15
Actuator sensor 16
Control system 17
Pin return spring 18
Locking surface 19
Pressure surface 20
Swivel bearing 21
Lever bearing 22
Actuation end 23
Release direction 24
Inner edge 25
Housing 26
Outer edge 27
Bore 28
Recess 29
Air gap 30

The invention claimed is:

1. An extinguishing system for explosion suppression comprising:
   at least one locking element;
   a closure member configured and arranged to be lockable in a closed position via the at least one locking element;
   an extinguishing agent container configured and arranged to be closed in a pressure-tight manner via the closure member;
   a triggering device, the triggering device configured and arranged to act on the locking element via an electromagnet, the electromagnet configured and arranged to transmit an electromagnetic field, the triggering device including:
   a pawl body including a pawl flank; and
   a sliding pin that includes a catch, the sliding pin configured and arranged to:
     trigger an extinguishing system for explosion suppression by movement along a longitudinal axis defined by the sliding pin, from a blocking position into a release position, and
     be held, in the blocking position, against the pawl flank by means of the catch.

2. The extinguishing system of claim 1, characterized in that the at least one locking element is configured and arranged to be blocked by means of an electromechanical actuator in the locking position of the closure member.

3. The extinguishing system of claim 2, further including an actuator sensor configured and arranged for monitoring the position of the electromechanical actuator.

4. The extinguishing system of claim 3, wherein the actuator sensor, a pawl sensor, and the actuator, and the electromagnet are connected to a control system.

5. Method for carrying out a test triggering of an extinguishing system according to claim 4, the method being characterized by the following steps:
   blocking the locking element in the locking position of the closure member by means of the actuator,
   checking the blocking by means of the actuator sensor,
   releasing the sliding pin by releasing the pawl body by means of the electromagnet,
   checking that the test triggering was carried out by means of the pawl sensor,
   resetting the pawl body,
   checking the position of the pawl body, and
   unlocking the locking element by means of the actuator.

6. The extinguishing system of claim 1, further comprising an air gap between the pawl body and the at least one electromagnet, wherein the air gap has a wedge-like tapering cross section.

7. The extinguishing system of claim 1, wherein the pawl body is an integral body.

8. The extinguishing system of claim 1, further including a return spring, and wherein the pawl body is configured and arranged to be prestressed by the return spring in the direction of an engagement of the catch and the pawl flank.

9. The extinguishing system of claim 1, further including a pivot point, and wherein the pawl body is pivotally mounted about the pivot point.

10. The extinguishing system of claim 9, wherein the sliding pin includes a connecting head; and wherein the pivot point is arranged in a region between the catch and the connecting head of the sliding pin, wherein the pivot point is further arranged next to the sliding pin.

11. The extinguishing system of claim 9, wherein the pivot point is arranged in an imaginary extension of the sliding pin in a release direction behind the catch.

12. The extinguishing system of claim 9, wherein the pivot point is positioned at a distance of between 10 mm and 50 mm from the electromagnet.

13. The extinguishing system of claim 1, wherein a pawl sensor is configured and arranged for monitoring the position of the pawl body.

14. The extinguishing system of claim 1, wherein the pawl body is movable by means of the electromagnet which acts directly on the pawl body for releasing the engagement of the catch and the pawl flank and for releasing the sliding pin.

15. The extinguishing system of claim 14, wherein the closure member is locked in a closed position via the at least one locking element.

16. The extinguishing system of claim 15, wherein the pawl flank is configured to interact with the catch of the sliding pin in the blocking position to keep the sliding pin in the blocking position against a preload force, which acts in a release direction.

17. The extinguishing system of claim 16, wherein a system pressure prevailing in the extinguishing agent container, which acts on the closure member and thereby exerts onto a locking surface of the closure member, causes the preload force.

* * * * *